(12) United States Patent
Alberts, III et al.

(10) Patent No.: US 6,565,637 B2
(45) Date of Patent: *May 20, 2003

(54) FILTER ASSEMBLY FOR A VACUUM CLEANER

(75) Inventors: John J. Alberts, III, Cadillac, MI (US); William H. Schmid, Cadillac, MI (US); Scott A. Zaremba, Cadillac, MI (US)

(73) Assignee: Rexair, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/128,107

(22) Filed: Apr. 23, 2002

(65) Prior Publication Data

US 2002/0152893 A1 Oct. 24, 2002

Related U.S. Application Data

(63) Continuation of application No. 09/911,234, filed on Jul. 23, 2001, now Pat. No. 6,432,180, which is a continuation of application No. 09/490,708, filed on Jan. 25, 2000, now Pat. No. 6,312,508, which is a continuation-in-part of application No. 09/302,212, filed on Apr. 29, 1999, now Pat. No. 6,174,350, which is a continuation-in-part of application No. 09/298,137, filed on Apr. 23, 1999, now Pat. No. 6,162,287.

(51) Int. Cl.$^7$ ............................................... B01D 47/02
(52) U.S. Cl. ....................... 96/333; 15/353; 55/DIG. 3; 96/337
(58) Field of Search ..................... 15/353, 347; 95/226; 55/372, DIG. 3, 320, 418, 495, 502, 503, 504, DIG. 31; 96/351, 353, 333, 334, 342, 348, 340, 329, 337, 338, 339

(56) References Cited

U.S. PATENT DOCUMENTS

| | | | |
|---|---|---|---|
| 3,279,157 A | 10/1966 | Andersson-Sason et al. | |
| 3,609,946 A | 10/1971 | Nakagawa et al. | |
| 3,841,067 A | 10/1974 | Kato et al. | |
| 4,036,346 A | 7/1977 | Livingston | |
| 4,342,131 A | 8/1982 | Reid | |
| 4,838,907 A | 6/1989 | Perry | |
| 5,096,475 A | 3/1992 | Kasper et al. | |
| 5,259,087 A | 11/1993 | Loveless et al. | |
| 5,280,666 A | 1/1994 | Wood et al. | |
| 5,301,388 A | 4/1994 | Zeren | |
| 5,339,487 A | 8/1994 | Kasper | |
| 5,388,301 A | 2/1995 | Bosyj et al. | |
| 5,535,500 A | 7/1996 | Stephens et al. | |
| 5,537,710 A | 7/1996 | Selewski et al. | |
| 5,924,642 A | 7/1999 | Krebs et al. | |
| 6,432,180 B2 * | 8/2002 | Alberts, III et al. | |

* cited by examiner

Primary Examiner—Duane S. Smith
(74) Attorney, Agent, or Firm—Howard & Howard

(57) ABSTRACT

A filter assembly for a vacuum cleaner that includes a main housing having an inlet and an outlet. A motor moves air from the inlet to the outlet, and a first filter is arranged between the inlet and the outlet for filtering the air. An inner wall and an outer wall that is spaced apart from the inner wall form a cavity between the walls. The cavity is located between the first filter and the outlet. The inner wall has an inner opening that permits air to flow from the first filter into the cavity, and the outer wall has an outer opening. A back cover is removably secured to the outer wall over the outer opening to seal the cavity and guide the air from the cavity to the outlet. The back cover includes an access opening that is removably secured to the back cover over the access opening to seal the access opening. A filter cartridge is removably disposed within the cavity. The filter cartridge has a first side with a first opening and a second side opposite the first side and adjacent to the access cover with a second opening. The filter cartridge has a second filter, such as a HEPA filter, disposed therein between the first and the second openings for further filtering the air. A portion of the first side is in sealing engagement with a portion of the inner wall such that the first opening is aligned with the inner opening wherein the motor moves the air from the inner opening to the second opening.

16 Claims, 4 Drawing Sheets

FILTER ASSEMBLY FOR A VACUUM CLEANER

RELATED APPLICATION

This application is a continuation application of assignee's pending application Ser. No. 09/911,234 filed Jul. 23, 2001, now U.S. Pat. No. 6,432,180 which is a continuation application of assignee's pending application Ser. No. 09/490,708, filed Jan. 25, 2000, now U.S. Pat. 6,312,508, which is a continuation-in-part of assignee's pending application Ser. No. 09/302,212 filed Apr. 29, 1999, now U.S. Pat. No. 6,174,350, issued Jan. 16, 2001, which is a continuation-in-part application of application Ser. No. 09/298,137 entitled "Improved Filter for Vacuum Cleaner", filed Apr. 23, 1999, now U.S. Pat. No. 6,162,287, issued Dec. 19, 2000.

BACKGROUND OF THE INVENTION

This invention relates to a vacuum cleaner having primary and secondary filters, and more specifically, to an improved filter assembly for use as a secondary filter.

Vacuum cleaners operate by filtering dirty air that flows through a main housing between a vacuum cleaner inlet and outlet. One well-known type of vacuum cleaner uses a primary filter that incorporates a basin filled with liquid, preferably water. A separator driven by a motor separates the dirt particles from the air and deposits them into the water. Although such filter arrangements can be highly effective, inevitably the vacuum cleaner filter is unable to filter all the air and smaller particles of dirt escape through the outlet. To address this problem, a secondary filter has been incorporated to further filter the air. The secondary filter is arranged between the primary filter and the outlet to trap very small dirt particles. A pleated fibrous filter, such as a HEPA filter, has been used that permits only virtually dirt-free air to be expelled from the vacuum cleaner outlet.

It is difficult to provide the vacuum cleaner user convenient access to the secondary filter located within the main housing when changing the filter. Several components have been used as part of the filter assembly, and may be eliminated to reduce cost. The filter has not been located within the housing in such a manner that ensures proper placement and easy replacement of the filter. Furthermore, when the user replaces the filter one is confronted with a dirty filter that is messy and undesirable in appearance. Therefore, what is needed is a self-contained filter assembly having fewer components that is self-locating for easy replacement.

SUMMARY OF THE INVENTION AND ADVANTAGES

The present invention provides a filter assembly for a vacuum cleaner that includes a main housing having an inlet and an outlet. A motor moves air from the inlet to the outlet, and a first filter is arranged between the inlet and the outlet for filtering the air. An inner wall and an outer wall that is spaced apart from the inner wall form a cavity between the walls. The cavity is located between the first filter and the outlet. The inner wall has an inner opening that permits air to flow from the first filter into the cavity, and the outer wall has an outer opening. A back cover is removably secured to the outer wall over the outer opening to seal the cavity and guide the air from the cavity to the outlet. The back cover includes an access opening that is removably secured to the back cover over the access opening to seal the access opening. A filter cartridge is removably disposed within the cavity. The filter cartridge has a first side with a first opening and a second side opposite the first side and adjacent to the access cover with a second opening. The filter cartridge has a second filter disposed therein between the first and the second openings for further filtering the air. A portion of the first side is in sealing engagement with a portion of the inner wall such that the first opening is aligned with the inner opening wherein the motor moves the air from the inner opening to the second opening.

Accordingly, the above filter assembly provides a self-contained filter assembly having fewer components that is self-locating for easy replacement.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
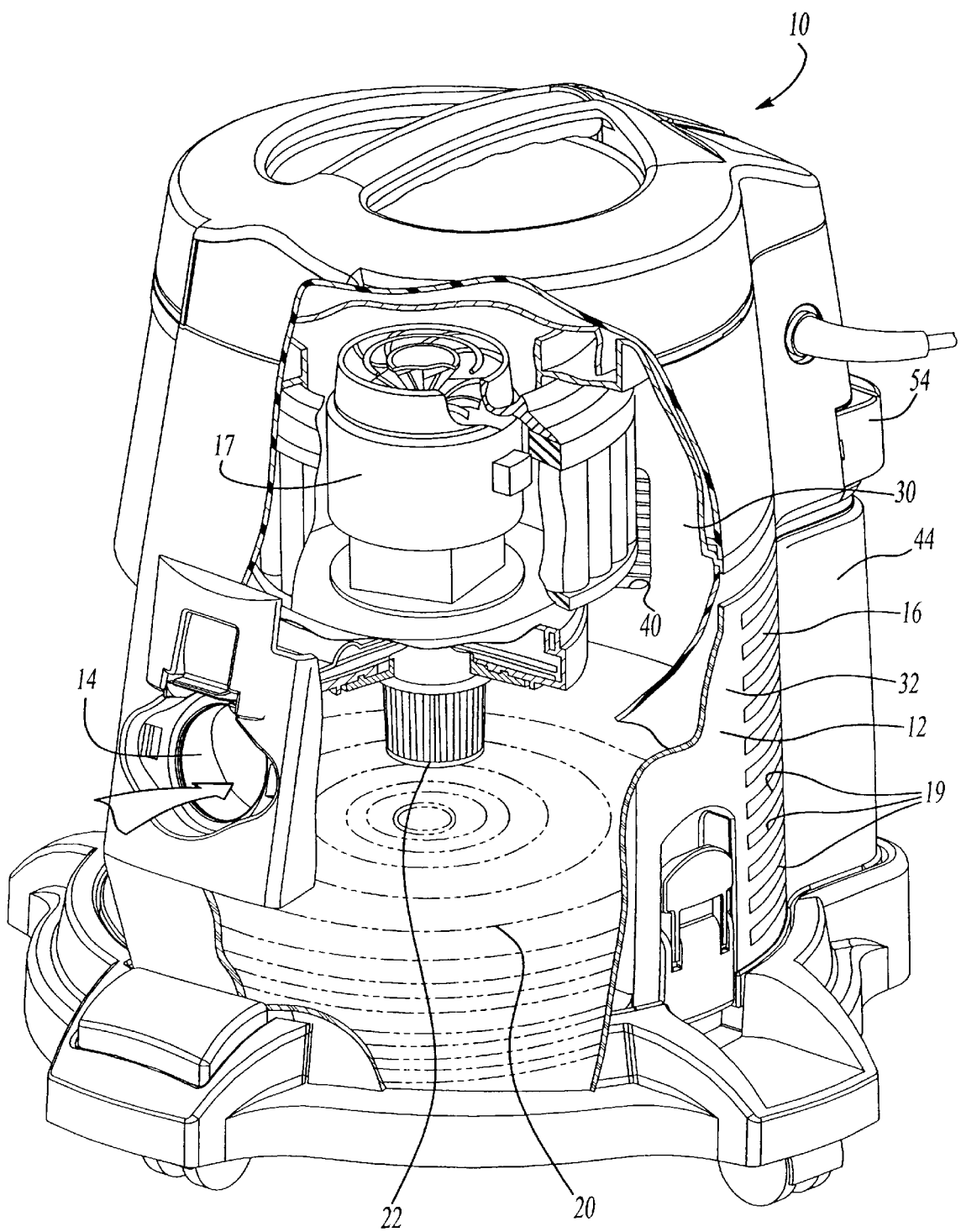
FIG. 1 is a partially broken perspective view of the vacuum cleaner of the present invention.
Figure 2:
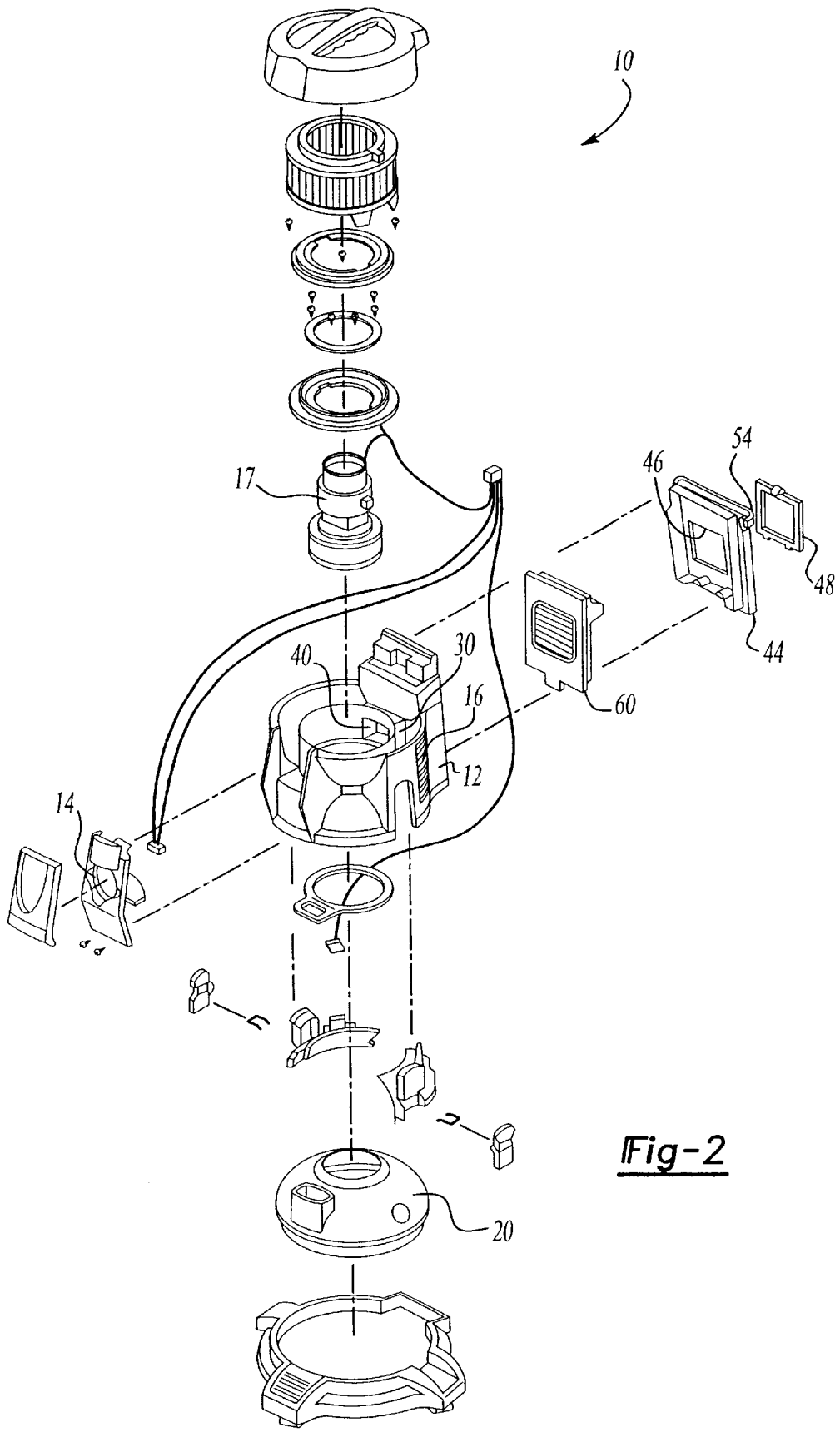
FIG. 2 is an exploded perspective view of the vacuum cleaner shown in FIG. 1.

A vacuum cleaner assembly is shown at 10 in FIG. 1 and 2. Vacuum cleaners using a liquid basin or water pan filter are known to those skilled in the art as described in U.S. Pat. No. 5,096,475, which is hereby incorporated by reference to this specification. The vacuum cleaner assembly 10 includes a main housing 12 having an inlet 14 and an outlet 16. The inlet 14 is preferably a round opening adapted to receive a vacuum hose. The outlet 16 includes a plurality of slotted vents 19 opposite the inlet 14. A motor 17 is supported within the main housing 12 between the inlet 14 and the outlet 16 for drawing air into the inlet 14 and exhausting air outwardly through the outlet 16. A primary or first filter, such as a water pan 20 filled with a liquid filter medium such as water, is arranged below the motor 17 between the inlet 14 and outlet 16. A separator 22 is driven by the motor 17 for separating dirt particles in the air and depositing them into the water in the water pan 20.

Figure 3:
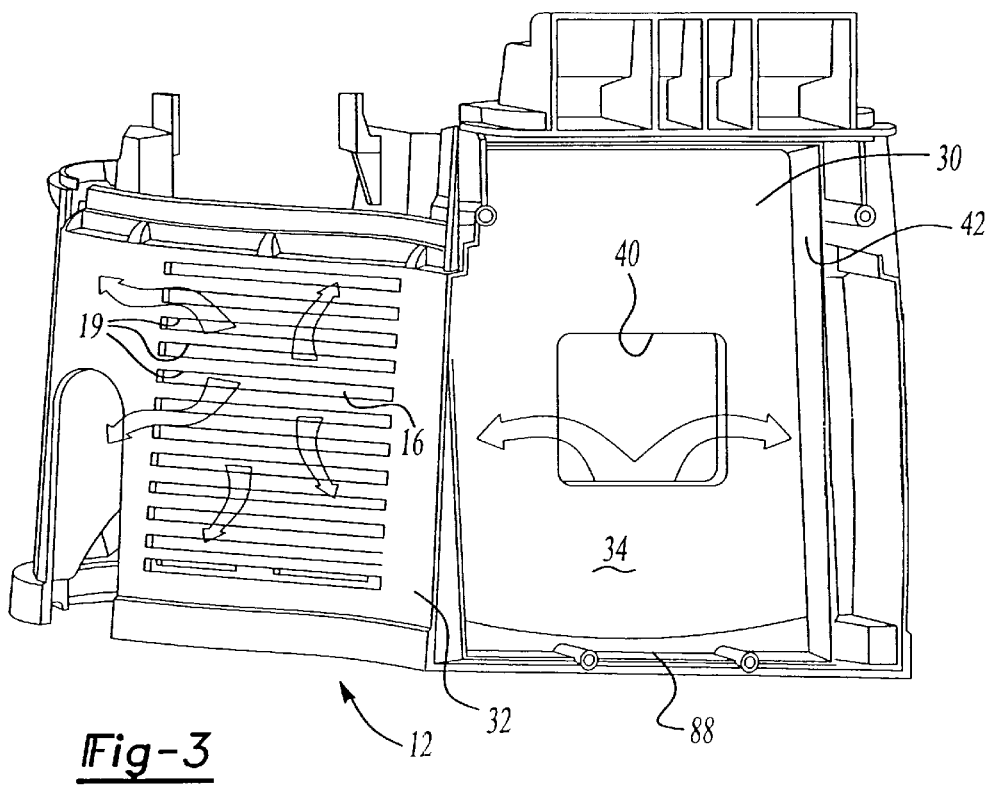
FIG. 3 is a partial rear perspective view of the vacuum cleaner of FIG. 1 with the back cover and filter cartridge of the present invention removed.

Referring to FIGS. 2 and 3, the main housing 12 has an inner wall 30 and an outer wall 32 spaced apart from the inner wall 30 forming a cavity 34 between the walls 30, 32. The main housing 12 may utilized several components to form the inner 30 and outer 32 walls. The cavity 34 is interposed between the water pan 20 and the outlet 16. The inner wall 30 has an inner opening 40 toward the interior of the main housing 12 that permits air to flow from the water pan 20 into the cavity 34. As shown in FIG. 3, air flows through the inner opening 40 and between the walls 30, 32, finally exiting through the outlet 16. The outer wall 32, or exterior wall of the main housing 12, has an outer opening 42 that provides access to the cavity 34. A back cover 44 is removably secured to the outer wall 32 over the outer opening 32 to seal the cavity 34 and guide or direct the air from the cavity 34 to the outlet 16.

Figure 4:
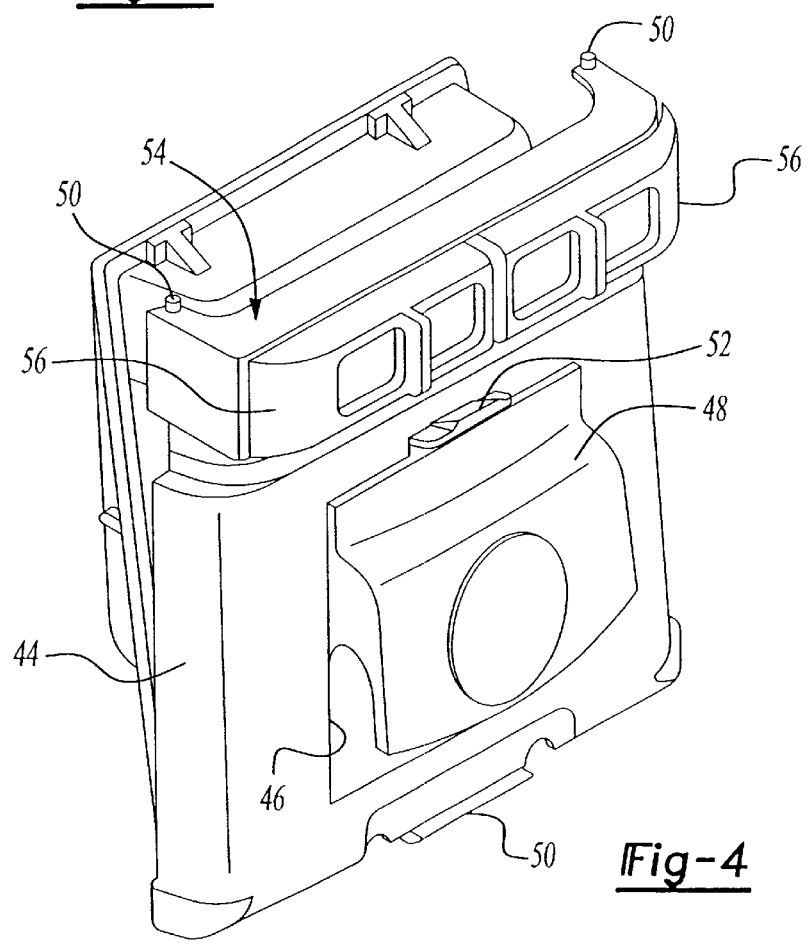
FIG. 4 is an exploded perspective view of the back cover and access cover of the present invention.

Referring to FIG. 4, the back cover 44 has an access opening 46 that is sealed by an access cover 48 removably secured to the back cover 44 over the access opening 46. The back cover 44 may be secured using threaded fastener, or tabs 50 integrally formed with the back cover 44 that coact with the outer wall 32. The access cover 48 is preferably secured to the back cover 44 by tabs 52. The access cover 48 is removed for use of a blower attachment, which is discussed in more detail below. The back cover 44 includes a cleat assembly 54 integral with the back cover 44 for stowing an electrical cord. The cleat assembly 54 is of the type disclosed in U.S. Pat. No. 5,924,642, which has retractable retaining arms 56 movable between retracted and extended positions. By incorporating the electrical cord cleat assembly 54 into the back cover 44, several components may be eliminated thereby simplifying assembly and reducing cost.

Figure 5:
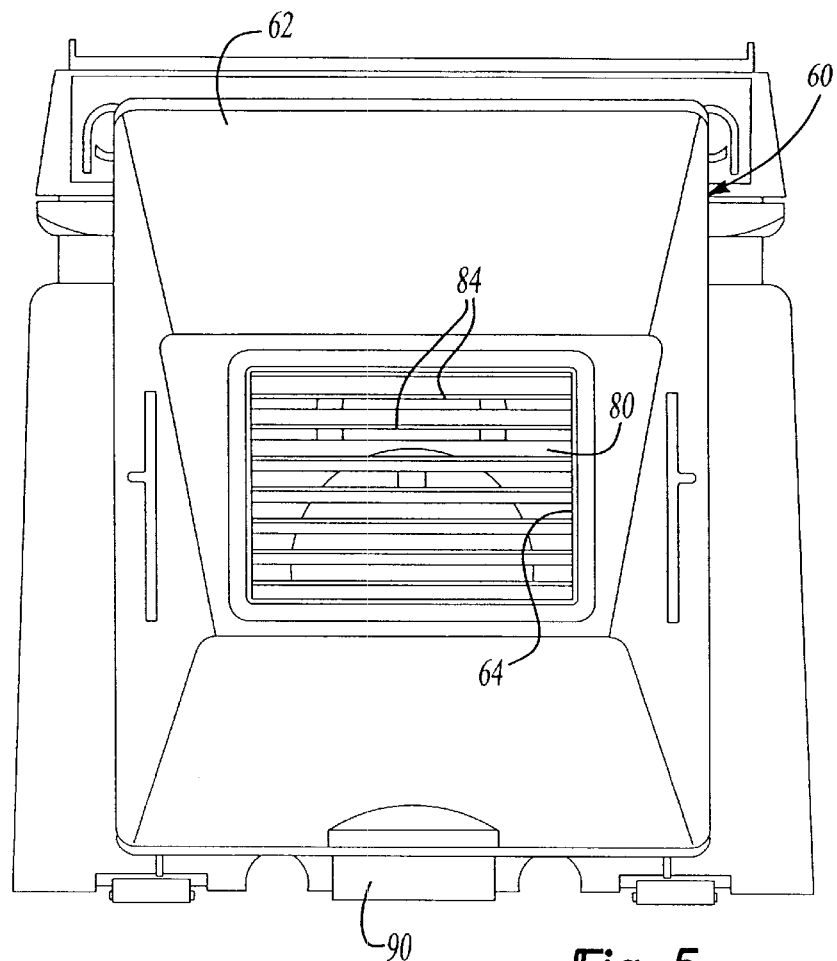
FIG. 5 is a rear perspective view of the filter cartridge of the present invention.
Figure 6:
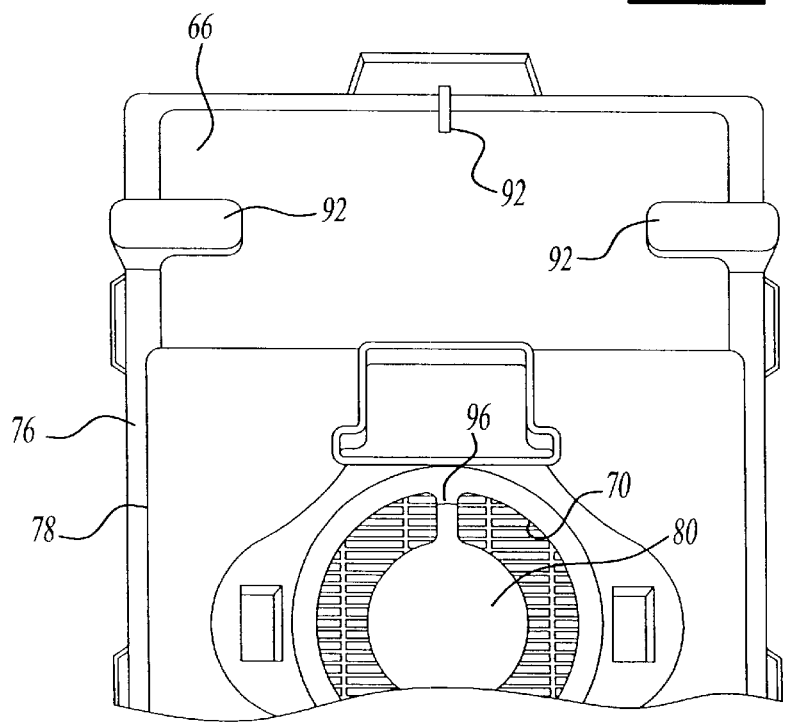
FIG. 6 is a front perspective view of the filter cartridge shown in FIG. 5.

The filter cartridge 60 of the present invention is removably disposed within the cavity 34. With reference to FIGS. 5 and 6, the filter cartridge 60 has a first side 62 with a first opening 64 and a second side 66 opposite the first side 62 with a second opening 70. The second side 66 is adjacent to the back cover 44 with the second opening 70 aligned with access cover 48. The filter cartridge 60 comprises first 76 and second 78 portions, respectively including first 62 and second 66 sides, are secured to one another, preferably by welding. A second filter 80, preferably a HEPA filter, is disposed between the portions 76, 78. Air flows through the filter 80 from the first opening 64 to the second opening 70. When the second filter 80 needs replacement, the whole filter cartridge 60 is replaced. In this manner, the messy filter 80 is retained within the clean filter cartridge 60 so that the user does not get dirty changing the filter 80. Additionally, a cleaner, more pleasing appearance is provided to the user.

A foam seal 82 is secured to a portion of the first side 62 around the first opening 64. The filter cartridge 60 is installed into the cavity 34 in sealing engagement with a portion of the inner wall 30 with the first opening 64 being aligned with the inner opening 40. The foam seal 82 ensures that the air flows through the second filter 80 and does not leak past the filter cartridge 60. The first portion 76 may include louvers 84 that extend across the first opening 64 for directing the air across the second filter 80 in a desired path.

To locate the filter cartridge 60 within the cavity 34, the outer wall 32 includes an aperture 88, preferably at the bottom of the outer opening 42. The filter cartridge 60 includes a downwardly depending tab 90 adapted to be received in the aperture 88 (shown in FIG. 3) for locating the filter cartridge 60 within the cavity 34. When the back cover 44 is removed, the filter cartridge 60 may be tilted forward for removal from the cavity 34. The second portion 78 includes at least one outwardly extending leg 92 for coacting with the back cover 44 and locating the filter cartridge 60 at a distance from the back cover 44 to permit the air to flow from the second opening 70 to the outlet 16 uninhibited.

The second portion 78 includes a collar 96 about the second opening 70 for a blower attachment when the access cover 48 is removed. The blower attachment may then be installed into the collar 96.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A filter assembly for a vacuum cleaner comprising:
    a housing having an inlet and an outlet;
    a filter cartridge disposed in a cavity formed by the housing between the inlet and the outlet;
    a back cover removably secured to housing over an outer opening to seal the cavity, the back cover having an access opening;
    an access cover removably secured to the back cover over said access opening to seal said access opening.

2. A filter assembly, as set forth in claim 1, wherein the filter cartridge has a first side with a first opening and a second side opposite the first side and adjacent to the access cover with a second opening, the filter cartridge having a second filter disposed therein between the first and the second openings for further filtering the air, and a portion of the first side in sealing engagement with a portion of the housing with the first opening being aligned with an inner opening of the housing.

3. A filter assembly, as set forth in claim 2, including a motor for moving air from the inlet to the outlet.

4. A filter assembly, as set forth in claim 3, further comprising:
    a separator driven by the motor; and
    a first filter located between the inlet and the filter cartridge, wherein the first filter comprises a basin filled with liquid for filtering the air.

5. A filter assembly, as set forth in claim 2, wherein the housing includes an inner wall and an outer wall spaced apart from the inner wall, the cavity being formed between the walls, the cavity interposed between the inlet and the outlet, the inner wall having an inner opening permitting air to flow from the inlet into the cavity and the outer wall having an outer opening.

6. A filter assembly, as set forth in claim 5, wherein the inner and the outer walls are formed by the housing.

7. A filter assembly, as set forth in claim 6, wherein the filter cartridge includes first and second portions secured to one another and further includes a second filter disposed therebetween.

8. A filter assembly, as set forth in claim 7, wherein the first and said second portions are secured to one another by welding.

9. A filter assembly, as set forth in claim 8, wherein the first portion includes a foam seal attached thereto about the inner opening for sealing against the inner wall.

10. A filter assembly, as set forth in claim 8, wherein the first portion includes louvers extending across the inner opening for directing the air across the second filter in a desired path.

11. A filter assembly, as set forth in claim 2, wherein the housing includes an aperture and the filter cartridge includes a depending tab adapted to be received in the aperture.

12. A filter assembly, as set forth in claim 2, wherein the housing includes at least one outwardly extending leg for coacting with the back cover and locating the filter cartridge at a distance therefrom.

13. A filter assembly, as set forth in claim 2, wherein the filter cartridge includes a HEPA filter.

14. A filter assembly, as set forth in claim 2, wherein the access cover includes a plurality of attachment tabs adapted to coact with the back cover for removably securing the access cover thereto.

15. A filter assembly, as set forth in claim 2, wherein the back cover includes a cleat assembly integral with the back cover for stowing an electrical cord, said cleat having retractable retaining arms movable between retracted and extended positions.

16. A filter assembly for a vacuum cleaner comprising:

a housing having an inlet and an outlet and defining a cavity;

a back cover removably secured to said outer wall over said outer opening, said back cover having an access opening;

an access cover removably secured to said back cover over said access opening; and a filter cartridge removably disposed within the cavity, said filter cartridge having a first side with a first opening and a second side adjacent to said access cover with a second opening, said filter cartridge having a filter disposed between said first and said second sides, and a portion of the first side in sealing engagement with a portion of the housing.

* * * * *